(12) United States Patent
Snow

(10) Patent No.: US 7,581,516 B2
(45) Date of Patent: Sep. 1, 2009

(54) WATER/ALCOHOL INJECTION FLOW SWITCH SAFETY DEVICE

(76) Inventor: Matthew Snow, 2205 Valley View, Woodland Park, CO (US) 80863

( * ) Notice: Subject to any disclaimer, the term of this patent is extended or adjusted under 35 U.S.C. 154(b) by 141 days.

(21) Appl. No.: 11/561,889

(22) Filed: Nov. 20, 2006

(65) Prior Publication Data

US 2007/0144485 A1    Jun. 28, 2007

Related U.S. Application Data

(60) Provisional application No. 60/597,266, filed on Nov. 18, 2005.

(51) Int. Cl.
*F02B 47/00* (2006.01)
*F02M 25/00* (2006.01)

(52) U.S. Cl. .................... 123/1 A; 123/25 R; 123/25 J

(58) Field of Classification Search ............. 123/1 A, 123/25 R, 25 A, 25 C, 25 E, 25 J, 25 Q
See application file for complete search history.

(56) References Cited

U.S. PATENT DOCUMENTS

| | | | | |
|---|---|---|---|---|
| 4,031,864 A * | 6/1977 | Crothers | ...................... | 123/1 A |
| 4,170,200 A * | 10/1979 | Takeuchi et al. | ................ | 123/3 |
| 4,402,296 A * | 9/1983 | Schwarz | ....................... | 123/575 |
| 4,581,707 A * | 4/1986 | Millar | .......................... | 702/47 |
| 4,993,386 A * | 2/1991 | Ozasa et al. | ................ | 123/25 J |
| 5,148,776 A * | 9/1992 | Connor | ....................... | 123/25 J |
| 5,560,344 A * | 10/1996 | Chan | .......................... | 123/515 |
| 6,170,441 B1 * | 1/2001 | Haldeman et al. | .......... | 123/25 D |
| 6,725,653 B2 * | 4/2004 | Brown et al. | ................... | 60/297 |
| 7,162,864 B1 * | 1/2007 | Schefer et al. | ................ | 60/286 |
| 7,197,407 B2 * | 3/2007 | Schimnowski et al. | ........ | 702/45 |
| 7,216,607 B2 * | 5/2007 | Mezheritsky et al. | ..... | 123/25 C |
| 7,290,505 B2 * | 11/2007 | Kamio et al. | ................ | 123/1 A |
| 7,370,609 B2 * | 5/2008 | Kamio | ......................... | 123/1 A |
| 7,389,751 B2 * | 6/2008 | Leone | ......................... | 123/1 A |
| 7,404,380 B2 * | 7/2008 | Hashimoto et al. | .......... | 123/1 A |
| 7,406,947 B2 * | 8/2008 | Lewis et al. | .................. | 123/478 |
| 2002/0029641 A1 * | 3/2002 | Larsson | ........................ | 73/861 |
| 2006/0249102 A1 * | 11/2006 | Morgan et al. | ............. | 123/25 J |
| 2006/0266307 A1 * | 11/2006 | Mezheritsky et al. | ..... | 123/25 C |
| 2007/0277775 A1 * | 12/2007 | Orlosky | ..................... | 123/25 C |

* cited by examiner

*Primary Examiner*—Thomas N Moulis
(74) *Attorney, Agent, or Firm*—Leyendecker and Lemire, LLC; Kurt Leyendecker

(57) ABSTRACT

An embodiment of a water/alcohol injection safety device adapted to signal a user and vehicle equipment when injection has reached a set flow rate specified by the user comprises a housing with external connectors and internal components. One connector is a fluid input port located on the housing adapted to receive a fluid into the housing. Another is a fluid output port located on the housing adapted to output the fluid from the housing. A third connector is a signal output connector located on the housing adapted to output an electrical signal therefrom a set period of time after a fluid flow rate between the fluid input and fluid output has dropped below a predetermined level. The components of the device include a flow switch and a delay switch located on the housing, the delay switch adapted to vary the set period of time based on a user's setting.

14 Claims, 4 Drawing Sheets

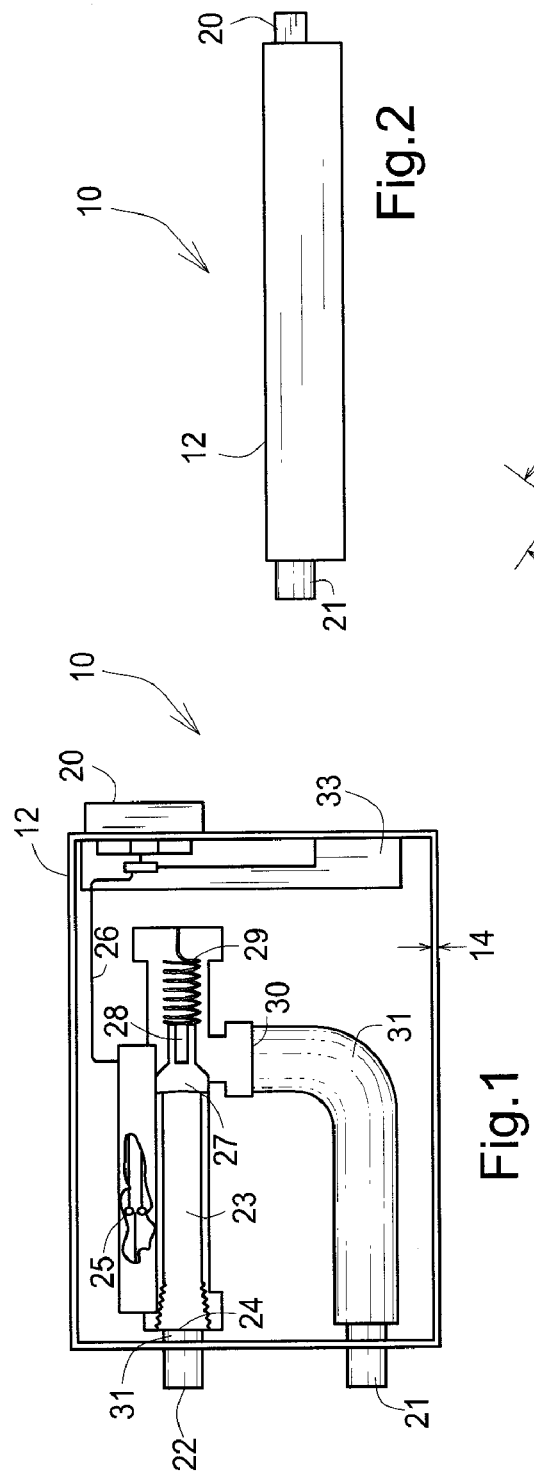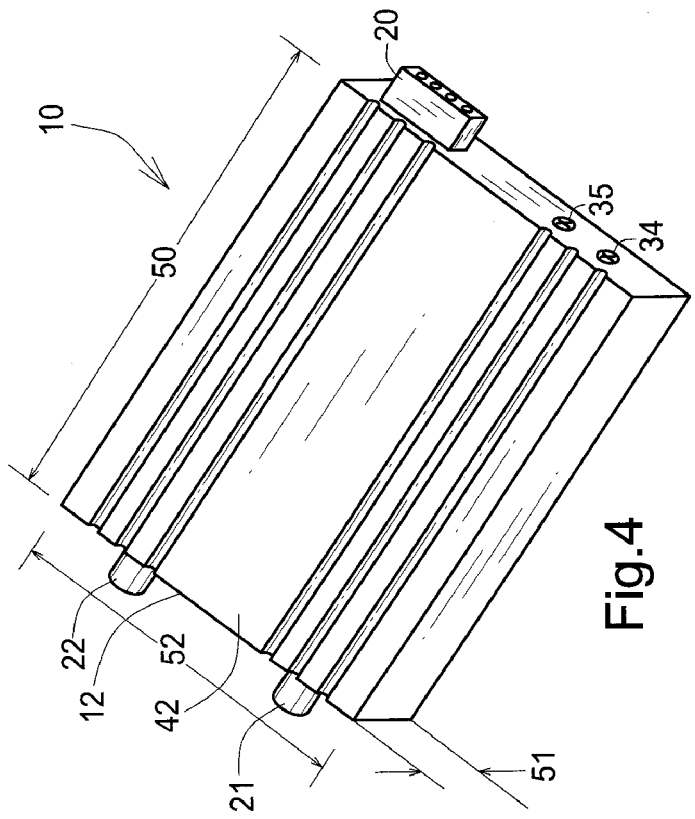

WATER/ALCOHOL INJECTION FLOW SWITCH SAFETY DEVICE

REFERENCE TO RELATED APPLICATIONS

This application claims priority to and incorporates fully by reference provisional application No. 60/597,266 filed on Nov. 18, 2005 entitled "Water/alcohol injection flow switch safety device." The provisional application has at least one inventor in common with this application.

FIELD OF THE INVENTION

This invention generally relates to water and water/alcohol injection systems for use with internal combustion engines.

BACKGROUND

Internal combustion engine power output is limited by a number of factors, one being heat. When the temperature of the combustion chamber reaches a certain level, the fuel-air mixture in the chamber may spontaneously combust (which is also known as "pre-ignition"). If the ignition device (such as a sparkplug) subsequently ignites, "knocking" may occur, leading to severe engine damage, such as, bending rods and damaging pistons. The likelihood of knocking increases as engine temperatures increase.

Engine temperatures increase with an increase in combustion chamber pressure. Combustion chamber pressure is substantially increased by adding a turbocharger or a supercharger to an engine. These devices create "boost", or engine power, by compressing the air entering the combustion chamber. Increasing chamber pressure leads to increased power output. All this increased pressure, however, increases the heat in the chamber, which, when aggressive ignition timing is incorporated, knocking may also occur at a higher rate.

Under this scenario, cooling the combustion chamber to decrease or eliminate pre-ignition is therefore highly desirable. Cooling not only leads to a decrease in the likelihood of severe engine component damage, but it decreases overall engine wear. Additionally, many aspects of engine performance are increased.

Engine cooling may be done via an intercooler. In one type of intercooler, ambient air is directed onto the intercooler device (similar to a radiator), cooling the intercooler core. The core may be co-located with radiators adapted to use cooling fluids to cool engine parts. Heat is transferred between the radiator fluid and the intercooler core to keep the engine cool. Many intercoolers add substantial weight to the engine, or are complex to install and maintain, and are therefore expensive. Therefore, other engine cooling methods have been developed.

During the Second World War, a mixture of water and methanol was used to cool aircraft engines. To do so, the mixture was added into the fuel and air that was entering the combustion chamber. Upon contacting the fuel-air mixture, water was found to cool the mixture. Cooling the mixture not only decreases knocking, but it also typically allows for more mixture to enter the cylinder. Therefore, a higher output charge is created since more fuel enters the chamber, creating an increase in performance.

During combustion, when injecting a water-methanol mixture, the mixture further reduces combustion chamber heat by absorbing heat from the exploding fuel-air mixture, with the water using the heat energy to convert from liquid to gas. Therefore, the heat energy released directly into the chamber is decreased. Reducing the temperature of the chamber reduces the potential for pre-ignition and knocking. Additionally, transforming the water into steam increases chamber pressure, which also increases power output. A water-methanol mixture is used because methanol's high octane rating decreases the likelihood that knocking and pre-ignition will occur, and because methanol combusts, it adds increased power to the chamber than what water alone can provide.

A severe problem created by water-alcohol injection systems, including water-methanol injection systems occurs when an incorrect amount of mixture is injected into the combustion chamber. This may occur when an injection line is blocked, or a mixture reservoir is depleted, or otherwise. Without a proper amount of water-methanol, the chamber is not properly cooled and pre-injection and knocking will likely occur at an increased rate during a turbocharged or supercharged state with aggressive timing, causing disastrous effects on an engine and requiring significant engine part replacement.

Current water-methanol injection systems do not properly address the problem of protecting engine components during injection-flow failure, and are limited in their use. For example, automobile injection systems are designed to run at a maximum air-fuel flow rates of 450 ml/min, which limits their use to 400 hp systems or below. Also, if the actual methanol-water flow rate from the pump is lower than what the water injection controller signals the pump to release for a specific boost level, engine damage may occur since the combustion chamber may not be cooled enough.

Some current injection systems are also deficient because they use a constant electronic signal to aggressively tune the system which, over time, may reduce the effectiveness of signal receptors such as solenoids and relays, thereby reducing the effectiveness of the entire injection system. Lastly, when flow rate drops, the injection system will immediately trigger the boost controller to dial back boost or open a wastegate so pressure is not increased in the chamber. In some systems, this may occur prematurely. For example, a false trigger may be given due to a false flowrate reading when a bump in the road accidentally drops water flow for a brief period.

SUMMARY OF THE DRAWINGS

FIG. 1 is a top view of an unpotted water-alcohol injection safety unit housing without a cover and showing a cut-away view of the flow switch.

FIG. 2 is a side view of a water-alcohol safety unit.

FIG. 3 is a front view of a water-alcohol injection safety unit.

FIG. 4 is an isometric rear view of a water-alcohol injection safety unit.

DETAILED DESCRIPTION

Figure 5:
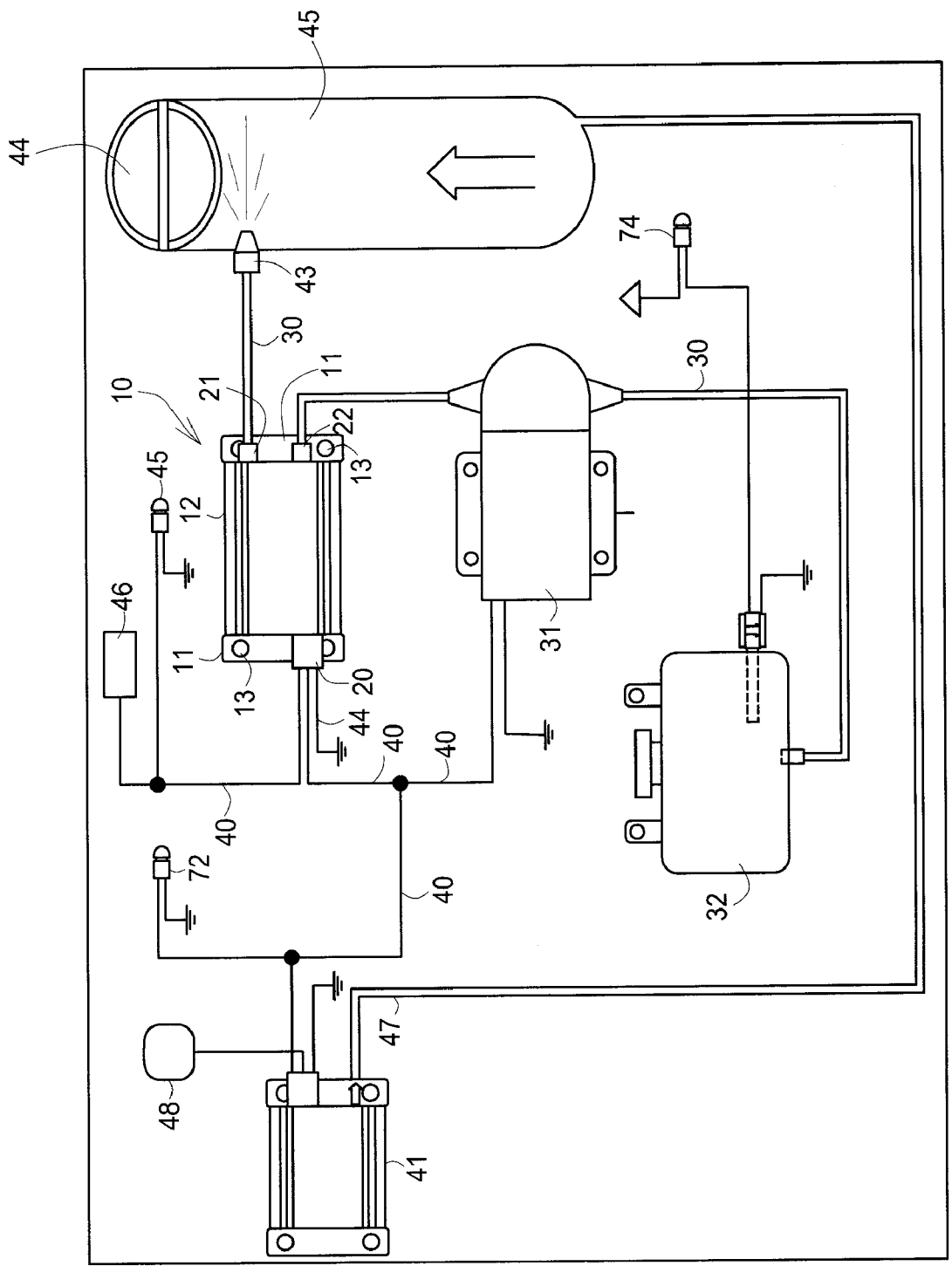
FIG. 5 is a diagram of a water-alcohol injection safety unit coupled to engine and water-alcohol injection system components.

One embodiment is a device adapted to read injection flow rate in an automobile water or water-alcohol (such as a water-methanol) injection cooling system, and to provide electronic signals to engine or injection system components. A version is comprised of a housing with three external connections—a fluid input port, a fluid output port, and an signal output connector. The fluid ports may also be known as hose connectors, while the signal output connector may be known as the electrical signal connector. In one embodiment the input hose connector is adapted to receive mixture from a hose coupled to a pump, while the output hose connector is adapted to send mixture through a hose to a nozzle. The term hose as used herein is meant to describe all flexible and nonflexible fluid conduit and conduit assemblies. The nozzle sprays mixture into the engine's intake.

Internal to the housing in a version is a flow switch. The input to the flow switch is coupled to the external fluid input port. The flow switch is also comprised of at least one output. In one embodiment, an output is coupled to tubing which is further coupled to the output hose connector. The hose connectors, flow switch, and tubing are adapted to work with fuel-air mixture flow rates above 450 ml/min. Therefore, an embodiment is adapted to work with 400hp engines and above.

The flow switch is adapted to provide an electronic signal output. The electronic signal may be output from the flow switch via at least one wire to an electronic signal receptor such as a circuit board. The signal output connector in one version is capable of receiving the signal by being mounted to the circuit board. The electronic signal may be generated by a hermetically sealed reed switch coupled to at least one wire, where a piston-magnet assembly causes the switch to close and send the electronic trigger signal to the wire when the flow reaches a specified flow rate.

One version includes a flow meter. The flow meter in an embodiment is internal to the unit and may be coupled to the tubing. The flow meter in a version reads the flow rate and provides an electronic signal to the electronic signal receptor through at least one wire. The signal output connector may include logic which determines if the flow rate is below a set point. A boost system control unit may also perform this function. If the flow rate is below this point, the unit may send out a 12 vdc signal. The receptor may also send a signal to the control unit so the control unit may inform the pump how much injection is required and to display the actual injection flow rate on a device such as an LCD screen.

An embodiment may also have a trigger signal flow rate switch and a delay switch. A trigger signal flow rate switch may be a user-adjustable external dial coupled to a circuit board. The trigger signal flow rate switch enables a user to adjust at what flow rate the trigger signal is sent. The delay switch will allow a user to delay sending the trigger signal from the unit. This feature may include a rotary dial and a delay circuit. The delay switch may significantly reduce false signals being sent out from the unit that flow has been reduced when in actuality, flow is stable.

In one embodiment, pump operation is controlled by a control signal wire sending signals from an injection system control box. The safety unit's signal output connector may receive power from the pump's control signal wire by being operatively coupled to the wire. In one embodiment, the electronic signal receptor receives power from the signal output connector and disperses power to the housing components. Upon receiving power, the safety unit is enabled to receive flow. Flow may be initiated through the safety unit by the pump upon the pump receiving a signal to initiate flow from the control signal wire. Upon flow initiation, one safety unit version is adapted to send a trigger signal of +12 vdc when the water-methanol flow is thereafter reduced to user-specified flow rate. One user-specified flow rate may be 0.1 liters per minute (lpm).

In one embodiment, the pump receives a signal to initiate water-methanol flow when boost is initiated above a set level. The pump may receive the signal to begin sending the water-methanol mix to the engine upon the injection system control box receiving a signal that a boost system is running and aggressive ignition timing has begun. The control box may receive its signals by being operatively coupled to a manifold pressure switch which determines when boost begins, or the control box may be coupled to a vehicle computer or MAP flow sensor which sends a signal to the controller that boost has initiated or aggressive ignition timing has begun. The control box may receive its boost pressure signals in another manner as well.

Together, the signal output connector and electronic signal receptor distribute the input and output electronic signals which control the functionality of one embodiment. For one, the signal output connector has a ground connection. The signal output connector also receives the +12 vdc trigger signal from the flow switch when the switch detects that flow has decreased to a specified level, such as 0.1 lpm. Upon receiving the trigger signal, the signal output connector initiates an indicator in one embodiment. The indicator may be a dash-mounted LED coupled to the connector with a wire. The trigger signal may also be used with an application control module that is adapted to adjust engine components to compensate for the reduced water-methanol flow. For example, the control module may be adapted to reduce or further control boost or the control module may adjust ignition timing in order to ensure that engine damage is eliminated or at the very least attempted to be kept to a minimum.

The 12 volt trigger signal that is used to reduce boost or change ignition timing is not a constant electronic signal. Therefore, solenoids and relays will be used less, thereby increasing the effective life of these items. Often, the effective life will extend beyond the life of similar items in systems using a constant voltage to perform aggressive engine tuning instead of a single 12 v signal.

Terminology:

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, tense or any singular or plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment", "a variation", "one variation", and similar phrases mean that a particular feature, structure, or characteristic described in connection with the embodiment is included in at least an embodiment of the invention. The appearances of phrases like "in one embodiment", "in an embodiment", or "in a variation" in various places in the specification are not necessarily all meant to refer to the same embodiment or variation.

The term "couple" or "coupled" as used in this specification and the appended claims refers to either an indirect or direct connection between the identified elements, components or objects. Often the manner of the coupling will be related specifically to the manner in which the two coupled elements interact.

The term "integrate" or "integrated" as used in this specification and the appended claims refers to a blending, uniting, or incorporation of the identified elements, components or objects into a unified whole.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The term "composite", "composites" or any version thereof refers to a solid material which is composed of two or more substances having different physical characteristics and in which each substance retains its identity while contributing desirable properties to the whole.

The terms "water-alcohol", "water/alcohol" and related variants as used herein refers to a mixture of water and alcohol in any suitable proportion. "Methanol" as used herein refers to a specific type of alcohol that is often used in water-alcohol injection systems. It is to be appreciated that in the art systems used to inject water or a mixture of water and alcohol into an internal combustion engine are also often referred to simply as water injection systems.

One Embodiment of a Water/Alcohol Injection System Safety Unit:

Referring to FIGS. 1 through 7, an embodiment of a water-alcohol injection safety unit 10 is displayed. The unit may also be referred to as a device or as a water injection unit or device. One embodiment of a water-alcohol injection system safety unit 10 is comprised of a housing 12 having external connectors and internal components. The housing is adapted to be coupled near the engine of a vehicle, and in one version, the housing may be coupled under the hood of a car. As best shown in FIG. 5, an embodiment may have two brackets 11 coupled to opposing ends of the housing, with each bracket having two bores 13.

The bores 13 are adapted to receive a bolt assembly, with the bolt assembly adapted to couple the unit 10 to a vehicle. Often, the unit is coupled to a sidewall of a vehicle's engine compartment. Mounting the unit directly on an engine block may damage the unit. The brackets are typically coupled to the housing through additional bores in the bracket adapted to align with holes in the housing and a bolt or screw assembly adapted to fit within the bores and holes. The brackets may serve as the ends of the housing, protecting the components inside the housing.

In one embodiment, at least one surface of the housing 12 may be a ridged surface. The top surface 42 may be a ridged surface, as best shown in FIG. 4. If the surface is a ridged surface, the thickness 14 of the walls of the housing may vary. The wall thickness may vary due to other reasons as well. In one embodiment, the wall thickness may be as thin as about 1/16 of an inch and as thick as about 3/16 of an inch. An embodiment may have other wall thickness levels as well. The length 50 of one housing may generally be 4.5 inches. The width 52 may be about 3.25 inches, and the thickness may be about 1.125 inches.

The housing 12 and brackets 11 are comprised of steel or a steel alloy in an embodiment. A version may be comprised of a composite material as well. The housing components may be potted (encased in epoxy) in an embodiment to help secure the components and so the components may survive the high temperatures that are produced in the engine and the unit itself.

The housing 12 of one embodiment includes 3 external connections. There is a signal output connector 20, a fluid input port 22, and a fluid output port 21 in a version. As best shown in FIG. 5, the hose connectors are each adapted to couple to, and exchange fluid with, a hose 30. The input connector hose is further coupled to a pump 31 in one version. A hose further connects the pump to a fluid reservoir 32. The pump is adapted to take a water-alcohol mixture such as water-methanol from the reservoir to the fluid input port (also known as an input connector) upon receiving a signal to do so from a boost control unit 41. The boost control unit may also light an injection LED 72 when water-methanol injection occurs. Similarly, the reservoir may light a LED 74 when the reservoir is near empty.

The output connector hose 30 is also coupled to a nozzle 43. The nozzle is adapted to spray mixture into the engine air flow. Typically, the nozzle is coupled to the engine air intake 45 before the throttle plate 44, although the nozzle may be coupled to inject mixture into the air flow after the throttle plate as well.

As best shown in FIG. 1, the fluid input port 22 is operatively coupled to a flow switch 23 either directly or through tubing 31. The tubing and flow switch material may be comprised of Ryton PPS (polypheylene sulfide). Other types of material resistant to corrosion and adapted for use in high-temperature environments may also be used. One type of flow switch that may be used in an embodiment is a Type FS-4 flow switch, part number 213818, from Gems Sensor, Inc., located in Plainville, Conn. As best shown in FIG. 1, the flow switch has at least one input 24 adapted to receive water-methanol mixture from the input connector. The flow switch may also have a hermetically sealed switch 25 coupled to at least one wire 26.

The flow switch 23 may also be comprised of a piston 27, magnet 28, and spring 29. As the mixture enters the flow switch, it encounters the piston, with the force of the water-alcohol flow pushing the piston head against the spring, enabling the mixture to flow through the switch output 30. The longitudinal axis of the switch output in an embodiment is at a 90 degree angle from the longitudinal axis of the switch input, as best shown in FIG. 1.

The movement of the piston 27 may be set to magnetically activate the hermetically sealed switch 25 at a specified flow rate. Therefore, after flow is initiated and mixture is flowing through the flow switch 23, in one embodiment, upon flow reaching a flow rate that is lower than an initial flow rate, the switch magnetically connects, and a 12 v trigger signal is sent to the wire 26. One such flow rate that the switch is set to send a signal at is a flow rate of 0.1 lpm.

As stated, flow may be initiated by the pump 31 receiving a signal from an injection system control box 41 informing the pump to do so. In one embodiment, the signal is sent from the control box, along a wire 40, to the pump. The wire 40 used to send the pump 31 a signal may be the control signal wire in an embodiment.

The injection system control box 41 receives power from a key-on source 48 in one version. Other power sources may be used in the system. The key-on source may be selected by the installer. Therefore, in one variation, the control box receives +12 v of power upon the ignition key turning to an "on" position. The control box may send this power to the pump 31 along the control signal wire. The control signal wire may also be tapped into so power to the safety unit 10 may be supplied. The safety unit may receive power through another source as well. The power is received at the safety unit by the signal output connector 20 and sent to the electrical signal receptor 33.

The injection system control box 41 also includes a boost pressure source line 47 in one embodiment. One end of the boost pressure source line may be coupled to an intake plenum. When the boost pressure reaches a user-specified level, the control box sends a signal to the pump 31 to initiate injection flow.

Figure 6:
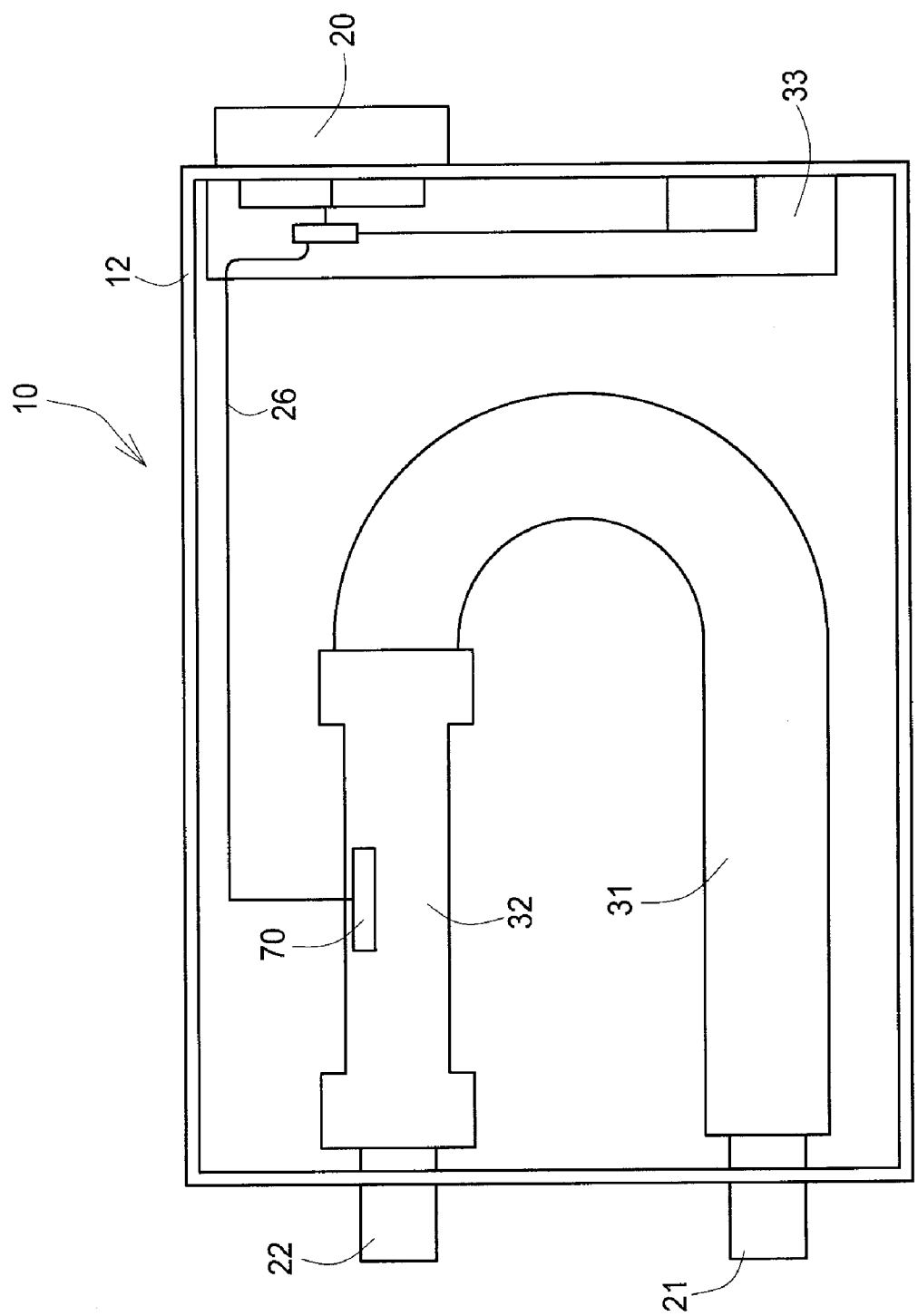
FIG. 6 is a top view of an unpotted water-alcohol injection safety unit housing without a cover and having a flow meter.

As best shown by FIG. 6, instead of a flow switch 23, internal to the safety unit 10 of one version may be a flow meter 32. The tubing may be coupled to the flow meter output and the output connector 21. The flow meter in one embodiment has a fluid input and a fluid output and is adapted to read the flow rate through the meter and provide a first signal proportional to the flow rate to at least one wire 26. The flow meter wire is substantially similar to the flow switch wire.

The flow meter 32 may also have flow meter circuitry 70. The circuitry may be adapted to output a binary second signal to the electronic signal receptor 33 when the flow rate drops below a set level as determined based on the first signal. The flow meter circuitry may also output the first signal to the electronic signal receptor.

Each of the two wires 26 are typically coupled to an electronic signal receptor 33. The electronic signal receptor may be an electronics board such as a circuit board. The signal output connector 20 may also be coupled to the electronic signal receptor. In one embodiment, the electronic signal receptor receives the electronic signal and transfers the signal to the signal output connector 20. The signal output connector may have 3 input signals that are operatively coupled to the electrical signal receptor, as best shown in FIG. 6, or the connector may have four electrical signal receptors, as best shown in FIGS. 1 and 4.

One embodiment is also comprised of two switches. The two switches are a trigger point switch 34 and a delay switch 35. The switches may be rotary dials. The dials may be accessible to the user on the outer surface of the unit, as best shown in FIG. 4. The dials may be capable of being adjusted with the use of a Phillips-head screwdriver. The trigger signal flow rate switch is coupled to the electronic signal receptor 33 in one version and may allow the user to set the flow rate at which the trigger signal is sent from the flow switch. In one embodiment, the user may adjust the trigger point flow rate from 0.1 lpm to 0.8 lpm. The delay switch may allow the user to delay the trigger signal being sent from the unit. The delay may be set at a 0.3 second delay, a 0.6 second delay, and no delay (a 0 second delay). In one embodiment, if a delay is set, no trigger signal is sent if the mixture flow rate reaches a point higher than the trigger point flow rate during the delay period.

The +12 v trigger signal is sent from a unit by the signal output connector 33 along at least one wire 40. The signal may be sent to an indicator 45. The indicator may be a dash mounted light emitting diode (LED). The signal may also be sent to an application control unit 46. The application control unit may be adapted to change the ignition timing or adapt the level of boost that is entering the ignition chamber. The application control unit may perform other functions. The signal output connector also has a ground wire 44.

In one embodiment having a flow meter 32, the flow meter signal is operatively received by the signal output connector 20 and sent along at least one wire 40. The wires 40 of one flow meter embodiment are 18 gauge wires rated for use in temperatures up to 105 degree Celsius. A flow switch embodiment may have the same type of wires. A version's wire that the flow meter signal is sent to is coupled to the injection system control box 41. An embodiment's flow meter signal may also be sent to the pump 31.

Figure 7:
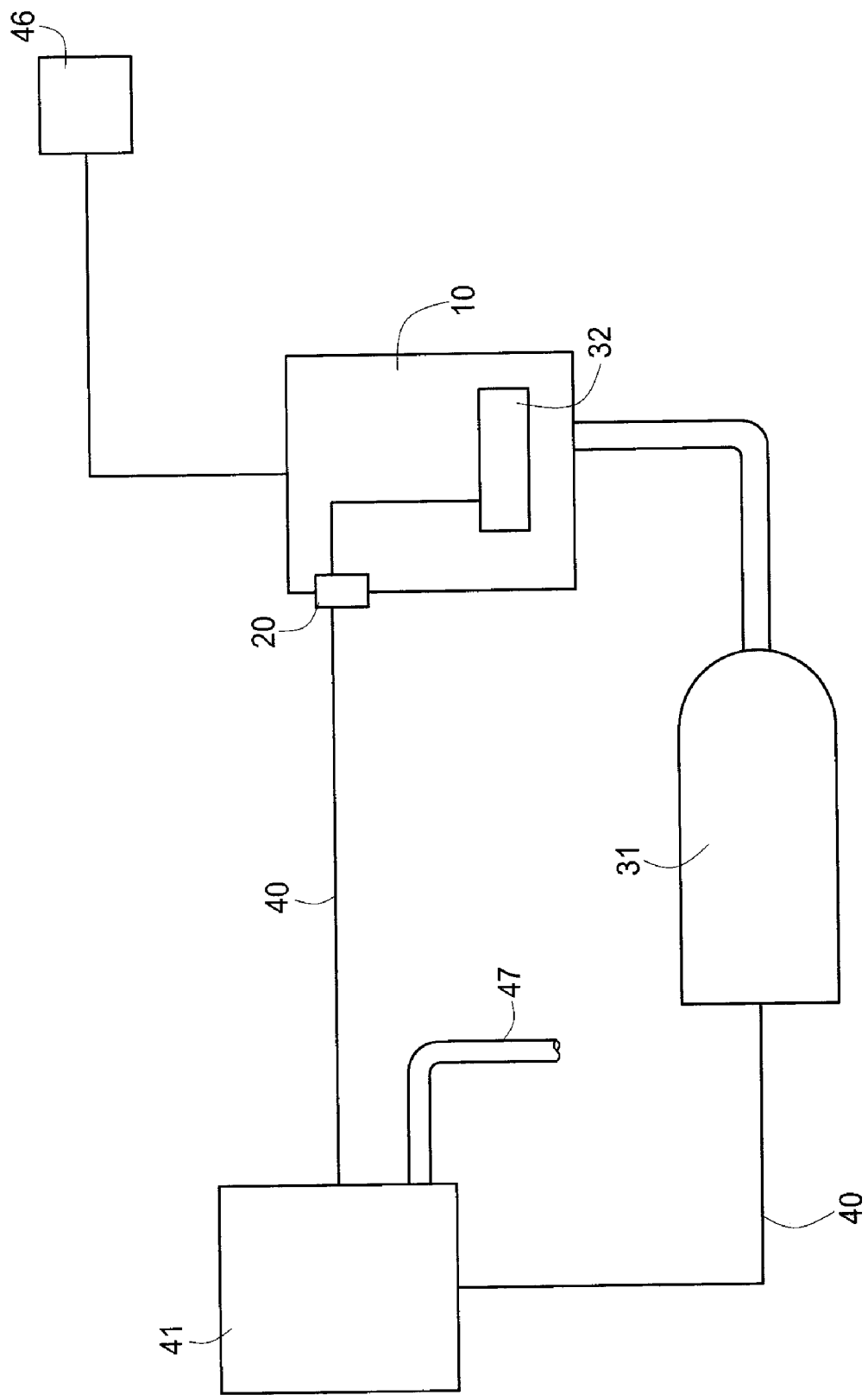
FIG. 7 is a diagram of a water-alcohol injection safety unit coupled to engine and water-alcohol injection system components in a closed-loop system.

As best shown by FIG. 7, one flow meter 32 embodiment is a closed loop system. The signal receiving unit (the control box 41 in FIG. 7, but the receiving unit may be the pump 31 in one embodiment where the pump has a controller) receives the signal and makes a comparison of the flow meter signal flow rate (the actual flow rate) to the flow rate that is was originally set by the injection system control box 41 based on the boost signal. The boost signal may be boost pressure supplied by the boost pressure source line 47 coupled to an associate internal combustion engine. In one embodiment, the boost control box 41 may receive boost pressure information from a pressure gauge or a MAP sensor. In any event, if the actual flow rate differs from the set flow rate, a new flow rate is set up or down to compensate for the difference. The new flow rate is sent to the pump over the wire and the pump sends the new mixture level to the unit 10.

In one embodiment, the unit 10 may include logic which performs at least some of the functions that the control box 41 performs in the closed-loop system. For example, the electronic signal receptor 33 may receive the signal from the flow meter and if the flow rate is below the point set by the control unit 41, the unit sends out a 12 v signal. Other operations may also be performed by the logic. The actual flow rate may also be displayed on an LCD screen, either dash-mounted, or otherwise. The signal to the LCD screen may be sent from the control unit or the safety device.

I claim:

1. A system for injecting a water/alcohol mixture into a boosted internal combustion engine, the system comprising:
    a reservoir adapted to contain the water/alcohol mixture;
    a fluid pump, the fluid pump being fluidly coupled to the reservoir;
    a pump controller including a sensor adapted to measure a boost level, the pump controller being electronically coupled with the fluid pump and adapted to control the operation thereof based on boost pressure levels;
    a nozzle, the nozzle being fluidly coupled with the pump; and
    a safety device discreet from the pump controller, the safety device being electrically coupled to the pump controller and including (i) a fluid flow path located between the pump and the nozzle and, (ii) a flow meter circuit being adapted to measure the rate of fluid flow through the fluid flow path and transmit a voltage signal based on the measured flow through the flow meter.

2. The system of claim 1, further comprising an application control unit, the application control unit being adapted to at least one of change the ignition timing of the boosted internal combustion engine and change the level of boost.

3. The system of claim 1, further comprising an illuminated indicator, the indicator being operatively coupled to the safety device to receive the voltage signal.

4. The system of claim 1, wherein the flow meter circuit comprises a flow switch having open and closed positions.

5. The system of claim 4, wherein the flow switch is adapted to close when the flow rate falls below a predetermined level and transmit the voltage signal.

6. The system of claim 5, wherein the predetermined level is less than 0.1 lpm.

7. The system of claim 4, wherein the safety device further includes a user adjustable trigger point switch, the trigger point switch permitting a user to adjust a predetermined minimum flow rate wherein the flow switch moves between open and closed positions and transmits the voltage signal.

8. The system of claim 7, wherein the predetermined minimum flow rate is adjustable between 0.1 lpm and 0.8 lpm.

9. The system of claim 1 further including a user adjustable delay switch, the delay switch permitting a user to set an amount of time from when the predetermined minimum flow rate is measured by the flow switch and the voltage signal is transmitted.

10. The system of claim 9, wherein the amount of time can be set as one of 0.0, 0.3 and 0.6 seconds.

11. The system of claim 2 in combination with a vehicle including the boosted internal combustion engine, the nozzle and the boost pressure sensor both being coupled to an air intake of the engine to inject a water/alcohol mixture into the engine and measure a boost pressure respectively.

12. The system of claim 9 in combination with a vehicle including the boosted internal combustion engine, the nozzle and the boost pressure sensor both being coupled to an air intake of the engine to inject a water/alcohol mixture into the engine and measure a boost pressure respectively.

13. The system of claim 11, wherein the boosted internal combustion engine is turbocharged.

14. A method of operating the system of claim 2, the method comprising:
  receiving a boost signal into the pump controller by way of the boost sensor;
  determining an optimum fluid flow rate at the pump controller based on the boost signal;
  sending electrical current to the pump to cause the pump to operate at a level necessary to obtain the optimum fluid flow rate;
  measuring the fluid flow rate at the safety device;
  transmitting the voltage signal to the application control device from the safety device when the fluid flow rate drops below a predetermined level; and
  one of changing timing and boost levels of the boosted internal combustion engine.

* * * * *